Patented Mar. 20, 1923.

1,449,319

UNITED STATES PATENT OFFICE.

ALBERT E. GREENE, OF SEATTLE, WASHINGTON.

PROCESS OF MELTING AND DEOXIDIZING STEEL.

No Drawing. Application filed May 3, 1916, Serial No. 95,107. Renewed April 5, 1921. Serial No. 458,693.

*To all whom it may concern:*

Be it known that I, ALBERT E. GREENE, citizen of the United States, residing at Seattle, in the county of King and State of Washington, have invented a certain new and useful Improvement in Processes of Melting and Deoxidizing Steel, of which the following is a full, clear, concise, and exact description.

My present invention relates to improvements in processes of treating metal either in molten condition or while being melted in electric furnaces, and more particularly to processes of deoxidizing the metal and keeping it deoxidized while treating it; and the process of my invention is applicable either to metals of alloys, including steel, and other iron alloys, and also other metals including copper and copper alloys.

Some features of my present invention are described in my co-pending applications for patent, Serial No. 470,366 filed January 2, 1909, and Serial No. 604,013 filed Jan. 23, 1911; and my present application is a continuation in part of these two above mentioned applications.

One object of my present invention is the treatment of metal either during or after melting to collect oxides of the metal under treatment in a special slag and reducing these oxides from said special slag.

A further object of my invention is to prevent oxidizing action on the metal beneath the slag and to keep oxygen from the atmosphere above the slag from oxidizing or getting into the metal; this object being accomplished by means of a reducing agent applied on top of the slag.

A still further object of my invention is to use fine carbonaceous material in combination with the special slag to reduce the oxides collecting in said slag.

Another object of my invention is to regulate the carbon content of the metal, for example steel or other iron alloy, both during the melting and after the metal is melted; and to provide means of adding the desired amount of carbon to the metal to combine with it and raise its percentage of carbon, but at the same time preventing undesired absorption of carbon by preventing the fine carbonaceous material added on the slag from getting into contact with the metal. In other words, my invention contemplates adding carbon to the metal during melting and meantime having a special slag on top of the metal and reducing said slag by fine carbonaceous material said slag keeping said fine carbonaceous material from getting into the metal and raising its carbon content.

Still another object of my invention is the treatment of steel in an electric furnace with a basic lining and with a special composition of slag, whereby elements like manganese in the steel being melted can be retained and saved from loss by oxidation, as for example in the melting of manganese steel scrap.

The principal feature of this invention is the special slag used in conjunction with a reducing agent. The nature of this slag is similar to a molten 'salt, that is a compound of a basic oxide with an acid oxide, having strong affinity for each other. Such a compound is more difficult to reduce than an oxide of a metal held in such a slag. Furthermore the affinity of the basic oxide for an oxide of opposite nature is largely satisfied by the acid oxide and this slag may be so regulated as to have almost no cutting action on the lining of the vessel containing it. Thus, I have found that in the melting of steel in a furnace lined with magnesite material, I am able to provide a very fluid slag which will contain nearly equal amounts of basic oxides and acid oxides without much cutting action on the magnesite lining on the furnace walls or banks. One such slag had the following composition: 41.7% silica, 32.4% calcium oxide, 15% magnesium oxide and the balance largely alumina, but a basic slag with this much silica in it is referred to for the purpose of showing how high the silica can be without much of any detrimental effect on the lining. Such a slag is very fluid in a steel furnace, and it is understood that its fluidity need not be so great as would be the case with this slag. The purpose of the special slag is to provide sufficient fluidity and at the same time maintain the basic and acid components within limits which will not damage the furnace lining; and in order to provide ample fluidity the silica content of such a slag need not be nearly so great as above mentioned. It is pointed out that there was a considerable proportion of magnesia in the above slag, and magnesia makes a more difficultly fusible slag. Where the slag is made up of lime and silica, ample fluidity can be had with a slag containing from 15% to 25% silica and even less silica. The important consideration is the fluidity and that it be sufficient to permit the oxides to readily collect in the slag and then be reduced by the carbonaceous material added on the slag. Fluid slag readily covers the surface of the molten steel or other metal beneath it and allows rapid action of the reducing agent added on top of it. Furthermore it effectually prevents the reducing agent touching the metal provided the reducing agent is added in fine form and not too great size to extend thru the slag. Fine ground coal or coke is very serviceable for this action. Metal held beneath such a slag is easy to melt and heat. The fluidity of the slag appears to aid in the conduction of heat to the metal. Where the heating is carried out in an arc furnace the slag serves to minimize the effect of the higher temperature of the arc. The fine coke or other reducing agent spread over the slag effectually prevents oxygen from the furnace atmosphere from getting at and oxidizing the metal.

My invention is carried out in a furnace where the heat is obtained by means other than combustion in the furnace chamber, and the electric furnace offers the only efficient means of heating at the present time. The process is applicable in furnaces lined with either basic or acid materials. In the melting of manganese steel scrap a basic lined furnace is particularly serviceable since it is desirable to provide the basic constituents of the slag in excess of the acid constituents. In the melting of manganese steel scrap the control of the carbon is also a very important feature and my present invention provides a simple and effective means of melting such scrap and saving the manganese therein.

I will now describe my invention as applied to the melting of manganese steel scrap for the purpose of retaining the composition approximately constant and making manganese steel. "Manganese steel" so called ordinarily contains about 12% manganese and about 1% carbon. The scrap is charged into an electric furnace of basic lining and melted down with a slag containing lime and silica or lime, magnesia and silica, the basic oxide or oxides being somewhat in excess of the percentage of silica but the silica being present to give ample fluidity to the slag. The silica may be added to the slag until it is sufficiently fluid. The silica may be obtained from the sand adhering to the foundry scrap. The composition of the slag when finally melted and reduced may be 15% to 25% silica or thereabouts and the balance lime, magnesia and alumina. Claims to similar matter are contained in my application filed January 2nd, 1909, Serial Number 470,366. Ordinary sand may be charged to furnish the silica; and in some cases the dripping of the silica roof or walls furnishes the necessary amount of silica. It is preferable to have a hot furnace so that the slag may be quickly melted. It will then rapidly cover the steel scrap and collect the oxides. As soon as a slag covers the bath or portion thereof fine carbonaceous material is charged on top of the slag. This reduces oxides of iron and manganese that may have collected in the slag and also prevents the slag from carrying oxygen from the atmosphere above the bath to the steel. The carbon added for purposes of reducing the slag is kept from contact with the steel, otherwise the steel would be recarburized. The oxides of iron and manganese in the slag can be utilized to aid in decarburizing the steel when such action is desired,—this being a selective oxidation of carbon in preference to manganese for example. The formation of a fluid slag is important in order to rapidly collect the oxides. Ordinarily the scrap will be melted down with very little change of composition under this reducing slag. Any loss of manganese as for example by vaporization may be corrected by addition of a little extra manganese.

The slag, altho quite high in silica, will have little if any cutting action on a magnesite lining. When the slag has been reduced sufficiently by the carbon its color will become light indicating that the oxides are well reduced out of it. A test sample of the metal should then be taken and after chilling should be broken to show the fracture and soundness of the metal. When well deoxidized the metal will usually show a solid fracture without even shrinkage cavity.

The slag and deoxidizing treatment described above is applicable to the ordinary carbon steel and to other alloy steels, and to metals in general including such metals as copper, zinc, etc.

In the making of manganese steel, part manganese steel scrap and part carbon steel scrap may be used, as for example, open hearth plate scrap, and ferromanganese added to provide the additional manganese required to bring the whole up to 12% or other desired amount. The loss of manganese during melting is usually negligible but to be on the safe side a slight extra addition of manganese may be made until the melter's experience shows this to be unnecessary.

In the melting of other steel than "manganese steel" the manganese may be supplied by charging manganese steel scrap or other manganese alloy in suitable proportion along with the other scrap and melting electrically under the kind of slag described above. There will be almost no loss of manganese during this treatment. A charge of steel might be made up as follows,—500 pounds open-hearth plate scrap, 500 pounds steel foundry scrap and 25 pounds manganese steel scrap. If the scrap is rusty an addition of a pound or so of fine coke in with the charge may be made. As soon as the slag is melted coke is added on top of the slag and if care is taken the slag may be reduced by the time the steel is sufficiently hot to pour. Ferrosilicon is then added to supply the required amount of silicon in the steel. A final sample is then taken to determine the carbon and deoxidation and if these tests are satisfactory the steel may then be poured.

Care should be exercised by the melter not to use coke or carbon too large to remain on top of the slag. If the carbon is on the bare metal or in contact with it carburization of the metal will take place rapidly.

Where metal has been previously refined under oxidizing slags and these slags removed the deoxidizing treatment of the molten steel may be carried out as described above. The addition of manganese may be made in the form of ferro alloy or in form of manganese steel scrap.

The control of carbon content of the steel melted will now be described:—

In the melting of rusty scrap such as old turnings or the like the oxide present will result in considerable oxidation of carbon from the steel unless carbon is supplied to take up this reaction. The melting of the scrap is carried out in connection with slags made as already described. In charging the scrap however, I prefer to make addition of fine coke or other form of carbon along with the scrap carbon present thru the charge. During melting the carbon so added reacts with the oxides and with a little experience the melter is enabled to determine the proper amount of carbon to add so as to have the carbon in the finished steel within the desired limits. To be safe it is preferable to have it finish a little low from the carbon additions and then finally regulate the percentage by adding pig iron.

The carbon added within the charge is to increase or keep from decreasing the carbon in the melted metal. The carbon added on top of the slag is to reduce the oxides collected there and to prevent oxidation of the elements of the steel by the oxygen of the furnace atmosphere. When the slag is sufficiently fluid considerable quantities of carbon may be added without danger of recarburizing the steel. This should be fine in form. I have added as much as 40 pounds of fine coke per ton of steel in order to hurry deoxidation.

Altho applicable in acid lined furnaces in which case the acid constituents of the slag are maintained in excess of the basic ingredients, I prefer the use of basic linings in the case of making manganese steel and where refining of the steel precedes the reducing or deoxidizing treatment.

Steel scrap containing chromium, vanadium or any other alloy metal may be treated according to the process described herein.

The advantages of the process lie in simplicity of handling of the slags which may be poured readily out of the furnace, and which have easily controlled fluidity making them well adapted to collecting the oxides in the charge, and deoxidizing of the metal.

The process is applicable in the melting or treatment of metal high in carbon in which case scrap with excessive amounts of oxide may be used or oxide may be charged with the metal, assuming decarburizing of the metal is desired. The process may be applied also to the melting of ferromanganese to maintain the composition constant and to minimize loss of manganese by covering the melted alloy with a lime-silica slag covered with fine coke to keep the slag reduced. Under the slag the vaporization of manganese is minimized and under the reducing conditions loss by oxidation is minimized. Oxides like magnesia or alumina may comprise the basic ingredients of the slag, either alone or associated with one another.

In the treatment of copper or copper alloys the slag treatment is the same as described above. If the metal is held in a furnace with basic lining the basic constituents of the slag are provided in excess of the acid constituents and lime and magnesia are the common oxides of basic nature to use. However, in the melting of brass, for example, an acid lining may be preferred on account of less expense or other reason, and the slag may be made up of silica as the main ingredient together with lime and soda or potash to form the basic constituents. Thus a slag may contain 15% each of soda and lime and the balance largely silica. Very fluid slags may thus be obtained at low temperatures.

Any suitable reducing agent may be used, including such agents as ferrosilicon which may be spread over the slag. It should be finely ground. Carbonaceous material is the cheapest agent, however. Reducing gas or liquid carbon compounds may be used.

It should be noted that in the foregoing I have not referred to any control of the temperature nor to any variation of the temperature such as reduction thereof, because I had not contemplated any such variation but assumed that the electric furnace would be operated in the usual way by providing sufficient electric energy to melt the charge and maintain it in molten condition by economizing in power. I prefer to regulate the temperature by starting with a higher voltage than is used after the charge is melted, but after the refining operation is under way, that is, after the charge has been melted. I prefer to maintain the temperature approximately constant and without any substantial variations.

It is understood that my process is not limited to the production of metal with any specific carbon content, especially in connection with the modification of my invention for adding carbon to combine with the metal. Thus I may melt steel scrap and incorporate carbon with the charge and cause the carbon to be taken up by the steel, and in such treatment I do not limit myself to the amount of carbon taken up, but may use this process to make the metal take up whatever amount is desired in the finished metal. I have found that it is especially advantageous to combine the deoxidizing slag treatment to prevent oxidation of the metal with the treatment outlined for incorporating carbon in the metal, thus taking out of the way any hindering tendency of oxygen and allowing the carbon to be absorbed or dissolved by the metal. It will be readily understood, that where the carbon is pulled, so to speak, by the iron on the one hand, and also by oxygen on the other provided oxygen is present, then the presence of oxygen exerts an action which tends to prevent the carbon from being taken up by the iron. My present invention provides means of causing the absorption of the carbon by the iron under a reducing slag, which therefore materially aids the process.

It is also to be understood that I do not limit myself as to the percentages of silica to be incorporated in the slag, and that where as I have stated one example of high silica in the slag where there were present lime and magnesia, this is not to be understood as the preferred percentage or even a specially desirable one, but I may use any amount of silica, even tho only a small amount is required, the amount being determined by the resultant fluidity of the slag under the reducing conditions. Nor do I limit myself as to what the basic ingredient of the slag is, provided it is one like lime magnesia or alumina,—that is a basic oxide or an alkaline earth oxide or an alkali metal oxide such as sodium oxide.

What I claim is:—

1. The process of melting iron in an electric furnace which consists in placing a charge of metal together with solid carbonaceous material into an electric furnace and melting such charge electrically and then subjecting the metal to a finishing treatment under reducing conditions.

2. The process of melting a mixture of iron or steel with oxide of iron and solid carbonaceous material in an electric furnace, the proportions of the respective ingredients being predetermined to give the desired final composition of metal, and then subjecting the bath to a finishing treatment by means of electric heat.

3. The method of treating steel which consists in providing a charge of metal in a basic lined electric furnace with a slag comprising lime, magnesia and silica and subjecting the slag to reducing action until it is approximately free from oxide of iron.

4. The method of treating metal in an electric furnace having a basic lining, which consists in providing a charge of metal therein with a slag comprising silica and alumina, and subjecting such slag to reducing action until it is approximately free from oxide of iron.

5. The process of refining steel which consists in charging steel scrap into an electric furnace together with slag-making materials comprising less than 40% silica and the remainder a basic oxide like lime, to form a fluid slag when the steel is melted, the lining of the furnace being basic to correspond with the ingredient of the slag which is in excess, and after bringing the charge to a suitable melting temperature for a length of time sufficient for the oxides of the steel scrap to cool in the slag, adding solid carbonaceous material on the top of the slag to reduce the oxides therein until the oxide of iron is substantially all reduced leaving the steel in deoxidized condition.

6. The method of treating steel scrap containing manganese which consists in melting in a basic lined electric furnace a charge of manganese steel scrap under cover of a fluid slag containing basic and acid oxides with the basic oxide in excess but with a sufficient quantity of acid oxide to give the slag fluidity, and covering the slag with a layer of solid carbonaceous material to cause a reducing action on the oxides in the slag and continuing the reducing action until the slag becomes light colored to indicate that the oxide of iron in such slag has been reduced, undesirable carburization of the steel being prevented by keeping the carbonaceous material separated from the molten metal bath by the stratum of slag.

7. The method of treating steel which consists in providing a charge of metal in a basic lined electric furnace, with a slag comprising lime and magnesia for the basic ingredient and silica for the acid ingredient, the proportion of the acid ingredient being less than 40%, melting such charge to effect the collection of oxides from the metal into the slag, and adding solid carbonaceous material to the slag and continuing the heating until substantially all of the oxide of iron is reduced from the slag and the metal bath under the slag deoxidized.

8. In the manufacture of steel in an electric furnace, the method of melting manganese steel scrap together with steel in an electric furnace, in the presence of a slag comprising basic and acid oxides, that ingredient being in excess which is of like nature to the lining of the furnace, and adding solid carbonaceous material to the slag and continuing the electric heating until the oxide of iron has been reduced from the slag and the latter becomes light colored, thereby deoxidizing the steel and obtaining manganese steel.

9. The process of making steel which consists in providing steel scrap in an electric furnace with solid carbonaceous material and materials comprising basic and acid oxides to form a slag, melting the charge electrically in the furnace and then adding a reducing agent on top of the slag to reduce the oxides which collect therein, while undesirable recarburizing of the charge is limited by controlling the amount of carbon added with the scrap, further contact of the molten metal with the reducing agent on top of the slag being prevented by the layer of fluid slag, and continuing the reduction until the oxide of iron is substantially all reduced.

10. The process of treating steel which consists in providing a charge of steel scrap with a slag comprising basic and acid oxides having a strong affinity for each other and serving to hold in suspension oxide of iron from the metal for reduction purposes, heating the charge to the melting temperature electrically to cause the oxide of iron to collect from the metal bath into the slag floating thereon, and then subjecting the slag to the action of a carbonaceous reducing agent added on top of the slag so as not to come in contact with the metal bath below the slag and continuing the reducing action until the desired oxide collected in the slag is reduced therefrom.

11. The process of deoxidizing metal which consists in maintaining the metal molten in an electric furnace under a slag comprising basic and acid oxides having affinity for each other and in such proportions as to form a fluid slag more difficult to reduce than the oxide of the metal treated, and subjecting the slag to the action of a solid reducing agent to effect the reduction of the oxide of metal and the de-oxidation of the metal during continued reduction irrespective of variation of temperature of the metal bath.

12. The process of refining steel which consists in charging steel scrap into an electric furnace together with slag-making materials comprising a basic oxide and an acid oxide in suitable proportions to form a fluid oxide when the steel scrap is melted, the component of the slag which is of like nature to the lining of the furnace being in excess, bringing the charge to a suitable melting temperature for a length of time sufficient for the oxides in and on the metal to collect in the slag, and adding a fine solid carbonaceous reducing agent on top of the slag to effect reduction of the iron oxide therein and the continued collection of oxide from the metal bath into the slag until the oxide of iron in the bath is substantially all reduced, leaving the steel in de-oxidized condition and the reduced steel of the slag in the bath, independently of change of temperature of the bath.

13. The method of treating steel which consists in providing a charge of steel scrap in an electric furnace lined with magnesite material with a slag comprising less than about 40% silica and the remainder being made up largely of calcium oxide, magnesium oxide and aluminum oxide and melting the charge electrically in said furnace to cause a collection of iron oxides therein into said slag, and covering the slag with a layer of fine solid carbonaceous material to cause a reducing action in the slag until the latter becomes light colored, and keeping the carbonaceous material separated from the molten bath by the stratum of the fluid slag floating thereon.

14. The process of deoxidizing a metal which consists in melting the metal in an electric furnace and effecting the covering of its surface with a stratum of slag composed of silica, calcium oxide, magnesia oxide and alumina mixed in proportions to form a fluid slag that is more difficult to reduce than the oxide of the metal treated, and subjecting such fluid slag to the action of a reducing agent until the oxide of the metal treated is reduced for passage from the slag into the molten metal and the latter itself is substantially deoxidized.

15. The process of manufacturing steel which consists in providing a charge of steel scrap and solid carbonaceous material in an electric furnace with a slag-forming material comprising acid and basic components other than the oxides of the metal itself, melting such charge to obtain a molten bath covered by a fluid slag, while the loss of carbon due to oxidation of the carbon during the melting step is being largely counteracted by the carbonaceous material in the charge, and then subjecting the fluid slag to reducing action until the steel is suitably deoxidized, and finally regulating the carbon content of the steel by suitable carbon containing material.

16. The method of treating steel to deoxidize it which consists in maintaining the steel melted in a basic lined electric furnace, providing a slag on the molten steel comprising lime and silica wherein the silica comprises less than one half the total weight of the slag and is present in such quantity as not to undesirably corrode the furnace lining, adding fine solid carbonaceous material onto the top of the slag and continuing the heating by means of electrical energy until substantially all of the oxide of iron in the bath is reduced leaving the steel in deoxidized condition, irrespective of variation of temperature of the molten metal.

17. In the manufacture of steel in an electric furnace, the process which consists of melting steel scrap approximately free from phosphorus, incorporating manganese in the steel during the melting by charging manganese steel scrap into the furnace in sufficient quantity to provide the necessary amount of metallic manganese, covering the bath of melted metal with a fluid slag comprising a basic oxide and an acid oxide in suitable proportions to not cause undue corrosion of the furnace lining, and reducing the oxide of iron from the slag and effecting the deoxidation of the molten bath and thereby obtaining refined manganese steel.

18. The process of manufacturing manganese steel which consists in melting steel scrap and manganese steel scrap in predetermined proportions in an electric furnace having a basic lining such charge being also provided with solid carbonaceous material to supply the loss of carbon in the steel during the melting thereof, electrically heating such charge in said electric furnace to secure the melting thereof, providing the molten bath with a fluid slag comprising basic and acid constituents with the basic constituents in excess of the acid constituents, and subjecting the slag to solid carbonaceous material on top thereof to effect reduction of the iron oxide collected therein from the bath of molten metal thereby deoxidizing the molten metal and recovering the iron from the iron oxide by causing the iron of the latter to go from said slag into the molten bath, and finally regulating the carbon content of the manganese steel by the addition of carbon containing material to the molten bath.

19. The method of treating iron or steel which consists in melting the same on a basic hearth with an oxidizing slag, removing said slag and applying to the bath a finishing slag comprising lime and silica in approximately such proportions as to form a neutral mixture which is neither strongly acid nor strongly basic, and finishing the metal with said slag.

20. The method of treating iron or steel which consists in applying thereto a slag comprising lime and silica, and maintaining the metal and slag molten on a basic hearth in an electric furnace, the slag comprising silica, lime and solid carbonaceous material.

21. The process of melting iron in an electric furnace which consists in placing a charge of metal together with carbonaceous material into an electric furnace and melting said charge electrically and then subjecting the metal to a finishing treatment under reducing conditions.

22. The process of melting a mixture of iron or steel containing oxide of iron associated therewith, said process consisting in charging carbonaceous material along with the metal into an electric furnace and therein melting it, the proportions of the ingredients of the charge being predetermined to give the desired composition of metal with respect to carbon, and finally subjecting the melted metal to electric heat while finishing the treatment.

23. The method of treating steel which consists in providing a charge of metal in an electric furnace with a slag comprising lime, magnesia and silica and subjecting the slag to reducing action.

24. The method of treating metal in an electric furnace which consists in providing a charge of metal therein with a slag comprising silica and alumina and subjecting such slag to a reducing action.

25. The process of making manganese steel which consists in treating steel by subjecting it to an oxidizing agent like manganese oxide at elevated temperature in an electric furnace and removing carbon from the steel, and then deoxidizing the steel by means of a fluid slag comprising silica and a basic oxide using a carbonaceous reducing agent and regulating the composition as desired.

26. The process of making manganese-containing steel which consists in subjecting the steel to the action of an oxide capable of combining with and removing carbon at elevated temperature, in an electric furnace, and then without removing the slag finishing the steel under a fluid slag from which the oxides are removed by treatment with a reducing agent leaving the steel deoxidized and finally, when the manganese content of the steel has been regulated, pouring the steel.

27. The process of treating manganese-containing steel in an electric furnace which consists in subjecting it to the action of an oxide of manganese whereby the carbon is removed from the steel and the manganese reduced, and then treating the steel under a slag containing silica and a basic oxide like lime or alumina and deoxidizing that slag by means of a reducing agent for the oxide of iron in it and after regulating the manganese content in the steel by any suitable means such as addition of manganese alloy, pouring the steel.

28. The process of treating a bath of steel in an electric furnace with an oxide to reduce the carbon and then without removing the slag, while the bath is covered with a fluid slag comprising basic and acid oxides in suitable proportions subjecting the bath to the action of a reducing agent.

29. The process of making steel containing low carbon and containing manganese in amounts of about 1% or more which consists in melting a charge in an electric furnace, subjecting the bath of molten steel to the action of an oxide containing manganese or iron, until the carbon is sufficiently low, and then deoxidizing the bath under a fluid slag by the action of a suitable reducing agent to reduce the oxides of iron and manganese therefrom, and after regulating the percentage of manganese, pouring the steel.

30. In the making of manganese steel in an electric furnace, the process of lowering the carbon by subjecting the metal to the action of an oxide of manganese and subsequently without removing the slag from the furnace deoxidizing the metal under a slag containing basic and acid oxide by treating it with a reducing agent, and after the manganese content is regulated as desired, pouring the heat.

31. The process of melting a charge of metal containing iron and regulating the carbon content thereof, said process consisting in charging carbonaceous material into an electric furnace along with the metal to be melted, the amount of carbon added being sufficient to raise the carbon percentage of the metal to the desired percent, and finishing the melting process under a reducing slag.

32. The process of melting steel scrap in an electric furnace and incorporating carbon therewith to make metal of a given carbon content, said process consisting of charging carbonaceous material together with the steel scrap as part of the electric furnace charge, regulating the amount of carbonaceous material per unit weight of steel to raise the carbon as desired, and providing a fluid slag on the metal comprising acid and basic oxides in suitable proportions and subjecting the slag to reducing action under the electric heat to finish the process.

33. The method of remelting manganese-containing steel scrap to save the manganese therein and control the carbon content in the finished steel, said process consisting in melting the scrap in an electric furnace, covering the melted metal with a slag comprising essentially silica and a basic oxide like lime, the silica being in small proportion but sufficient to give fluidity to the slag, and adding a fine carbonaceous reducing agent on the slag to reduce the oxide of manganese therein, but preventing undesired taking up of carbon by the metal by keeping the added carbonaceous material on top of the fluid slag.

34. The method of treating steel scrap to make metal of a desired carbon content therewith, said method consisting of melting the steel scrap together with a predetermined weight of carbonaceous material in an electric furnace under a reducing slag and causing the carbon to be taken up by the melted metal and meantime subjecting the metal to deoxidizing treatment under said slag.

35. The process of treating iron or steel to make metal of a given carbon content, said process consisting in charging the metal into an electric furnace and there melting it in contact with carbon causing the carbon to be combined with the melted metal to the desired extent but meantime subjecting the melted metal to treatment under a reducing slag on which fine carbonaceous material is added to reduce the slag but preventing the said fine material from getting into contact with the metal beneath the slag.

36. The process of combining carbon with iron in an electric furnace said process consisting in adding carbonaceous material in contact with the metal during the melting and covering the melted metal with a fluid slag and throwing fine carbonaceous material on top of said slag to reduce the oxides therein.

37. The process of treating metal in an electric furnace, said process consisting in providing a slag on top of a bath of molten metal in said furnace, said slag comprising a basic non-ferrous oxide and an acid oxide like silica in suitable proportions to give the desired fluidity, the oxide similar to the major ingredient of the furnace hearth lining being in excess and subjecting the slag to the action of solid carbonaceous reducing agent added on top of the slag so as not to get in contact with the metal beneath the slag, meantime maintaining the temperature electrically.

38. The process of melting iron or steel which consists in providing a suitable electric furnace and a bath of molten metal therein under a fluid slag, the slag comprising acid and basic oxides like silica and alumina or lime in proportions to give fluidity without undue wear on the furnace lining, and while maintaining the temperature electrically adding a solid reducing agent on the slag and reducing the oxide of iron in the slag, and then making any final additions of alloy metals desired and tapping the metal.

39. The process of making steel from steel scrap suitably free from impurities not desired in the steel, the process consisting in providing an electric furnace with a refractory lining containing silica and of essentially acid nature, melting the scrap therein and providing a slag therefor containing silica together with another oxide basic to silica to give the slag fluidity, this basic oxide being of such nature as will not be reduced materially under the reducing treatment of the process, and meantime adding a solid carbonaceous reducing agent to the slag and continuing the treatment until the slag has been sufficiently reduced, and then after adjusting the composition of the steel, pouring the heat.

40. The process of treating iron or steel which consists in charging the scrap into an electric furnace together with slag making materials containing silica and a non-ferrous oxide basic to silica in suitable proportions to make a fluid slag without undue wear on the furnace lining, and after bringing the charge to a suitable melting temperature allowing the oxides to collect in the slag and meantime adding a solid carbonaceous reducing agent in pulverized condition on top of the slag and reducing the oxides until the metal is sufficiently deoxidized.

41. The process of melting steel scrap and saving an alloyed metal contained in the scrap, the process consisting of melting the scrap in an electric furnace and covering it with a fluid slag comprising silica and a non-ferrous basic oxide, collecting the oxides which enter with the scrap in this slag, adding a solid carbonaceous reducing agent on the slag and continuing this reducing action until the slag is deoxidized and also the steel suitably deoxidized.

In witness whereof I hereunto subscribe by name this 17th day of April A. D., 1916.

ALBERT E. GREENE.

Witnesses:
T. D. EVERTS,
GERTRUDE E. GREENE.

DISCLAIMER 1,449,319.—*Albert E. Greene*, Seattle, Wash. PROCESS OF MELTING AND DEOXIDIZING STEEL. Patent dated March 20, 1923. Disclaimer filed October 3, 1933, by the patentee.

Hereby enters this disclaimer to that part of the claim in said specification which is in the following words, to wit:

"3. The method of treating steel which consists in providing a charge of metal in a basic lined electric furnace with a slag comprising lime, magnesia and silica and subjecting the slag to reducing action until it is approximately free from oxide of iron.

"4. The method of treating metal in an electric furnace having a basic lining, which consists in providing a charge of metal therein with a slag comprising silica and alumina, and subjecting such slag to reducing action until it is approximately free from oxide of iron."

"20. The method of treating iron or steel which consists in applying thereto a slag comprising lime and silica, and maintaining the metal and slag molten on a basic hearth in an electric furnace, the slag comprising silica, lime and solid carbonaceous material."

"23. The method of treating steel which consists in providing a charge of metal in an electric furnace with a slag comprising lime, magnesia and silica and subjecting the slag to reducing action.

"24. The method of treating metal in an electric furnace which consists in providing a charge of metal therein with a slag comprising silica and alumina and subjecting such slag to a reducing action."

[*Official Gazette October 31, 1933.*]